United States Patent
Berk

[11] 3,758,267
[45] Sept. 11, 1973

[54] APPARATUS FOR PREHEATING SCRAP MATERIAL OR THE LIKE

[75] Inventor: Edward J. Berk, Chicago, Ill.

[73] Assignee: Goodman Equipment Corporation, Chicago, Ill.

[22] Filed: Jan. 6, 1972

[21] Appl. No.: 215,846

[52] U.S. Cl............................. 432/134, 266/335
[51] Int. Cl............................................. F27b 3/00
[58] Field of Search................ 263/21 C; 266/21, 266/33, 33 S; 432/134

[56] References Cited
UNITED STATES PATENTS

| | | |
|---|---|---|
| 3,667,747 | 6/1972 | Graybill et al.................... 263/21 C |
| 3,381,950 | 5/1968 | Ellis................................. 263/21 C |
| 3,365,182 | 1/1968 | Ipsen................................ 263/21 C |
| 3,539,163 | 11/1970 | Mitchell........................... 263/21 C |
| 2,719,780 | 10/1955 | Kornhauser et al................. 266/15 |
| 3,133,628 | 5/1964 | Butler et al...................... 263/21 C |

Primary Examiner—John J. Camby
Attorney—William W. Anderson et al.

[57] ABSTRACT

An apparatus is provided for delivering preheated scrap to a furnace and includes, in a preferred embodiment, an insulated shaker conveyor trough and means for heating the scrap material within the trough while containing gases produced incident to the heating of the scrap to hinder such gases from escaping to the atmosphere surrounding the trough.

11 Claims, 4 Drawing Figures

APPARATUS FOR PREHEATING SCRAP MATERIAL OR THE LIKE

The present invention relates to apparatus for delivering preheated scrap metal to a furnace. More particularly, the invention is directed to a preheater and a shaker conveyor which together operate to deliver preheated scrap metal to a furnace.

In various foundry operations, as well as in the production of cast iron and steel, it is customary to charge a furnace with scrap metal. In foundries, for example, scrap metal may be the sole source of raw material, while in the manufacture of cast iron or steel, scrap metal is frequently used in combination with metaliferous ores. The scrap metal may take various forms, but it is not uncommon to use sheet shearings, punchings, turnings, chippings, bushelings, gates, risers, scrapped castings, etc., many of which have a relatively large surface area per unit of weight. Frequently, this scrap is contaminated with entrapped or surface moisture, particularly if the scrap has been stored out of doors. In addition, it is not uncommon for the scrap to be coated with cutting oils, residue of wash solutions, and the like, as a result of previous manufacturing operations.

It is undesirable to charge contaminated scrap into a furnace. Entrapped moisture or other readily vaporizable materials will expand rapidly in the heat of a furnace and can precipitate explosions. In addition, the residues or oils which do not vaporize immediately may contaminate the molten metal and produce an inferior product.

Accordingly, in the past, scrap metal has been placed in large buckets prior to its introduction into the furnace, each bucket being provided with a heater adjacent its bottom wall to raise the temperature of the scrap and vaporize and drive off contaminants. However, this approach has several disadvantages. In the first place, it is a batch-type process which has inherent limitations insofar as efficiency is concerned. In addition, the heated vapors are generally allowed to escape to the atmosphere, frequently causing severe pollution in the surrounding area. The use of systems in which the scrap is conveyed past heaters or through preheating ovens has been attempted, but available conveyors have been unable to withstand the heat required to drive off the contaminants and they soon fail due to severe warping and rapid deterioration. In addition, with such systems, it is frequently desirable to halt the charge briefly adjacent the heaters or within the ovens and to then continue to advance the charge after a predetermined period of time. Certain forms of conveyors, however, such as the oscillatory or vibratory type, are difficult to start up when heavily loaded.

Accordingly, the principal object of the present invention is to provide an improved apparatus for delivering preheated scrap metal to a furnace.

A related object of the invention is to provide such an apparatus which is effective to preheat scrap metal sufficiently to vaporize volatile contaminants adhering to or entrapped within the scrap while containing the volatilized contaminants so as to minimize pollution.

These and other objects and advantages of the invention will become apparent with reference to the following description and the accompanying drawings.

Figure 1:
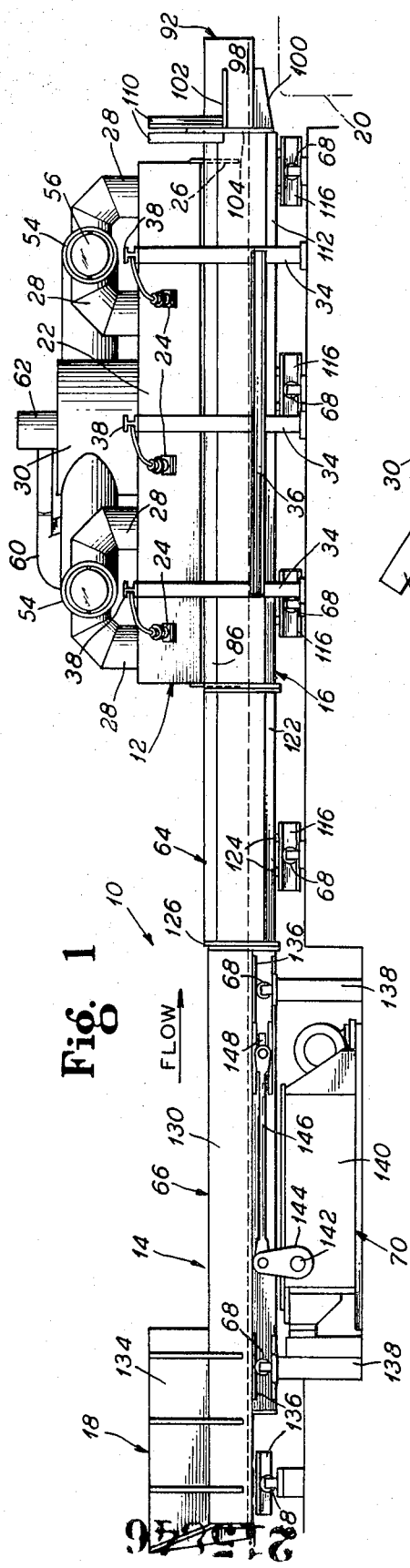
FIG. 1 is a side elevational view of an apparatus showing various of the features of the invention.

Very generally, there is illustrated in the drawings an apparatus 10 comprising a preheater unit 12 and a shaker conveyor 14, including an insulated trough 16. The shaker conveyor undergoes horizontal reciprocal motion to advance scrap material from a loading station 18 to and through the preheater unit 12 directly to a furnace (not shown) or, as in the illustrated embodiment, to a furnace charging bucket 20. The preheater unit 12 includes a hood 22 which supports combustion burners 24 adapted to direct a flame onto scrap supported by the insulated trough 16 of the conveyor 14. A sealing plate 26 is mounted at each end of the hood 22 and cooperates with the insulated trough 16 to contain the gases of combustion as well as the contaminants vaporized beneath the hood. Suitable ducts 28 convey gases of combustion as well as volatilized contaminants to an after burner 30 which insures complete combustion of the gases drawn from beneath the hood.

More specifically, the preheater 12 includes a supporting framework comprising vertical posts 34 which are reinforced by horizontally extending braces 36 and which support overhead cross beams 38. The hood 22 is connected to and suspended from the overhead cross beams 38. In a typical construction, the hood may be formed of metal sheets or plates insulated internally, as with a refractory product or other suitable material adapted to withstand the heat generated beneath the hood. As illustrated, the hood is elongated in the direction of the conveyor 14 and is generally trapezoidal in transverse cross section (FIG. 3) so as to include a top wall 40, side walls 42 which are inclined to the vertical, and end walls 44. The hood includes no bottom wall and is therefore open downwardly.

Figure 3:
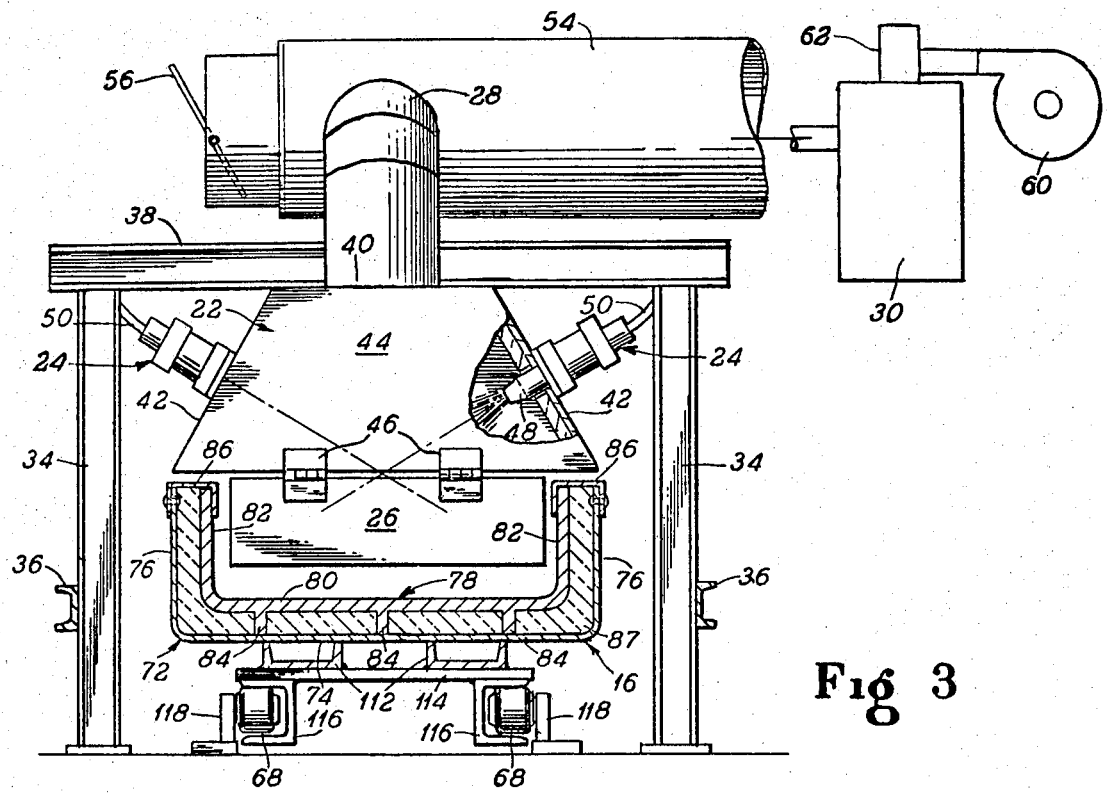
FIG. 3 is an enlarged fragmentary sectional elevational view taken along line 3—3 of FIG. 2.
Figure 4:
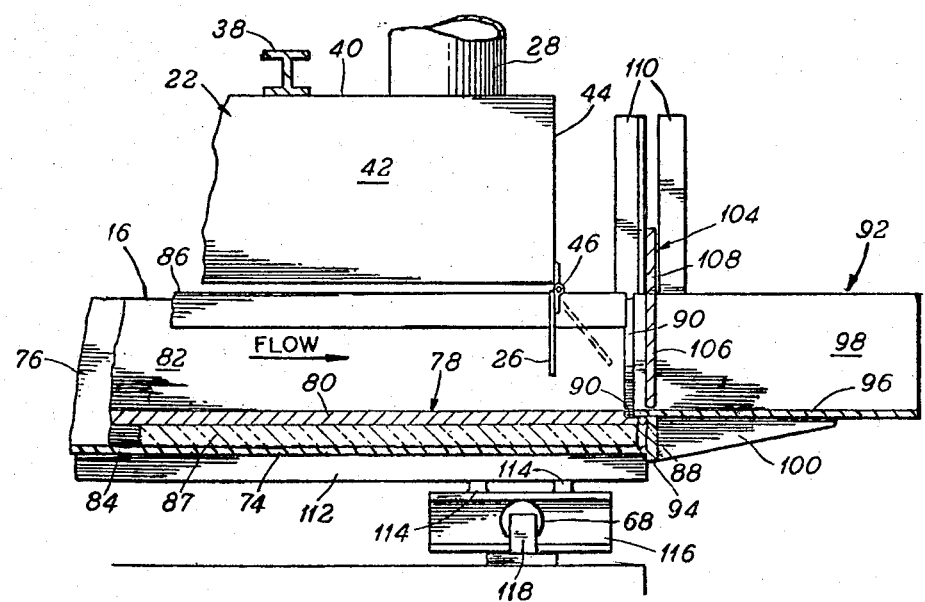
FIG. 4 is an enlarged fragmentary sectional elevational view taken along line 4—4 of FIG. 2.

In order to contain the products of combustion and vaporization so as to prevent pollution of the surrounding environment, the hood is mounted with the lower edges of its side and end walls disposed in close proximity to the upper edges of the walls of the insulated trough 16 of the conveyor, as seen best in FIGS. 3 and 4. Such a relationship is possible with the use of a shaker-type conveyor which reciprocates horizontally but undergoes no vertical movement. In addition, the sealing plates 26 are provided at each end of the hood and are of generally rectangular configuration, as is the transverse cross-sectional configuration of the interior or loading compartment of the insulated conveyor trough 16. Each sealing plate is connected by hinges 46 adjacent the lower edge of an end wall 44 of the hood so as to hang downwardly from that edge into the confines of the loading compartment of the trough. As can be seen in FIG. 3, the lateral edges of each of the sealing plates terminate short of the inner surface of the side walls of the insulated trough 16 and the lower edge of each plate terminates short of the upper surface of the bottom wall of the trough. Accordingly, the plates are free to pivot about their hinge axis incident to engagement by the scrap as the trough reciprocates and the scrap is advanced. It is preferable that the sealing plates be dimensioned so as to provide as much obstruction as possible to the passage of gases outwardly of the trough from beneath the hood without interfering with the operation of the trough and without impeding the movement of scrap therealong.

The combustion burners 26 are mounted in suitable openings in the side walls 42 of the hood and include nozzles 48 (FIG. 3) which project into the interior of the hood, the remainder of the burners being located outside the hood. Suitable conduits 50 are provided to convey a fuel such as natural gas, oil, etc., to the burners from a source of supply (not shown). Preferably, the fuel is supplied to the burners under pressure so that the flame emitted from the nozzles 48 projects outwardly some distance beyond the nozzle into the load-receiving compartment of the insulated trough 16 for impingement of the scrap contained therein. As illustrated, the inclination of the burners is such that an extension of their longitudinal axes will intersect a line connecting the midpoints of the lower edges of the end walls of the hood. While much of the scrap is heated by direct impingement of the flame on the scrap, there will, of course, also be some radiant heating of the scrap as well due to the elevated temperature beneath the hood.

As previously mentioned, scrap which is introduced into a furnace may take the form of very fine pieces such as thin sheet metal stampings, turnings and chips, as well as heavier pieces such as gates, risers and scrapped castings. Turnings and chips generally can only withstand temperatures of 300° to 400° F without oxidizing, whereas it is frequently desirable to heat heavier pieces to as high as 1,700°F. Accordingly, the preheater unit preferably includes means for varying the temperature beneath the hood and for controlling the temperature of the flame emitted by the burners 24, as by controlling the combustible mixture supplied to the burners.

It will be appreciated that the operation of the burners themselves will produce the normal products of combustion as well as partially burned gases resulting from incomplete combustion. In addition, the heating of the scrap will cause various gases to be created as a result of a vaporization of moisture, oils, etc. on the surface of the scrap. The hood, in conjunction with the sealing plates 26 and the insulated trough 16, serves to contain these gases and means are provided for conducting the contained gases out of the hood and passing them through the after burner 30 to complete the combustion of any unburned gases and to effect a combustion of any combustible vapors which leave the scrap. The withdrawing of the gases out of the hood creates a negative pressure beneath the hood which reduces the tendency of the gases to bypass the sealing plates 26 and pass outwardly into the surrounding environment and causes air to be drawn into the trough and hood to provide oxygen for combustion.

More specifically, the top wall 40 of the hood 22 is provided with two pair of side-by-side relatively large exhaust ports, each of which is connected to one of the exhaust ducts 28. The ducts 28 of each pair are, in turn, connected to a common feeder duct 54 which projects in each of opposite directions beyond its juncture with the exhaust ducts 28. Each feeder duct 54 is provided adjacent one end with a damper 56, and the opposite end of each feeder duct is in communication with the combustion chamber of the after burner. The ducts 54 are connected adjacent the upper end of the after burner housing so that the exhaust gases will enter the chamber at the upper end and pass the flame of a burner (not shown) provided therein. The burned gases are drawn from the after burner housing through a stack 62 into which a blower 60 discharges air to induce a draft. Additional blowers (not shown) may also be provided for supplying air for combustion to the space beneath the hood 22 and to the housing of the after burner 30.

The conveyor 14 extends from the loading station 18 to a discharge stationaat which is located the furnace or the furnace charging bucket 20, moving material from left to right as viewed in the drawings. The conveyor 14 is of the type commonly referred to as a shaker conveyor, i.e., it advances material contained thereon by virtue of a reciprocal movement of the conveyor along a fixed horizontal axis. Examples of such conveyors are shown in U.S. Pat. Nos. 2,029,133; 2,665,798; 3,133,628; 3,191,763; and 3,417,882. The conveyor 14 includes the insulated trough 16 as well as a connecting trough 64 by means of which the insulated trough 16 is coupled to a driving and loading trough 66. The troughs are rigidly interconnected end-to-end and are supported on rollers 68 for reciprocal movement imparted by means of a drive unit 70.

More specifically, the insulated trough 16 is elongated in the direction of its reciprocal movement and is preferably somewhat longer than the hood 22 by at least the length of stroke imparted to the trough by the drive unit 70. The insulated trough itself (FIGS. 3 and 4) includes an outer shell 72 of U-shaped configuration in transverse cross section formed, for example, of steel and including a bottom wall 74 and side walls 76. Carried within the outer shell 72 is an inner shell or liner 78 formed of a material such as a cast iron which is capable of withstanding high temperatures without distortion or warping. The liner 78 includes a bottom wall 80 which is narrower than the bottom wall 74 of the outer shell 72, and includes side walls 82 which are of a lesser height than the side walls 76 of the outer shell. The liner is therefore adapted to be, and is, supported within the confines of the outer shell 72 with the upper edges of the side walls 76 and 82 lying in a common horizontal plane and with the adjacent surfaces of the side walls and bottom walls separated from each other to define a space therebetween. The lower surface of the bottom wall of the liner 78 is provided with longitudinally extending ribs 84 which rest upon the bottom wall 74 of the outer shell 72 to maintain the spacing between the bottom walls 74 and 80 respectively of the outer shell and liner. A longitudinally extending cap 86 of inverted U-shaped transverse cross-sectional configuration overlies and interconnects the adjacent upper edges of the side walls 76 and 82 along the length thereof, and overlies as well the space between the side walls.

As previously noted, the insulated trough 16 supports the scrap beneath the hood 22 while the scrap is heated by directing impingement of the flame emitted by the burners 24 as well as by radiant heat. The insulated trough 16 is therefore subjected to considerable heat which may be in a range of as low as 300°F for light gauge sheet metal scrap or chips to as high as 1,700°F for larger pieces of scrap. These high temperatures, particularly at the upper end of the range, would normally tend to raise the temperature of the outer shell to a degree sufficient to warp it to the extent of impairing efficient cooperation between the rollers 68 and the trough, or to a degree sufficient to create a safety hazard for persons working in the vicinity of the trough.

Accordingly, the space between the outer shell and the liner is completely filled with an insulating material 87 capable of withstanding the heat to which the trough is subjected and of reducing the transfer of heat from the liner 78 to the outer shell 72. In a preferred embodiment, the insulating material is in the form of a sheet or blanket formed of ceramic fibers made from kaolin, an alumina-silica fiber, sold under the trademark KAOWOOL by Babcock & Wilcox Co. This material is a semi-porous bulk solid which has a high resistance to the circulation of entrapped air between the fibers which would effect a transfer of heat from the liner 78 to the outer shell 72.

It will be appreciated that the liner will undergo thermal expansion as it is initially subjected to heat beneath the hood, or if the temperature beneath the hood is raised, as for different forms of scrap. Accordingly, the liner 78 is formed so as to be of slightly lesser length than the outer shell 72 to provide a gap 88 (FIG. 4) between the end of the liner and the end of the outer shell at the forward end of the trough 16. In addition, the inner surface of the forward end portions of the bottom wall 80 and the side walls 82 of the liner 78 are provided with a groove 90 to accommodate the edge of a discharge throat 92, hereinafter described, a portion of which overlaps the gap 88 and therefore provides a bridge to protect the insulation beneath the gap.

Figure 2:
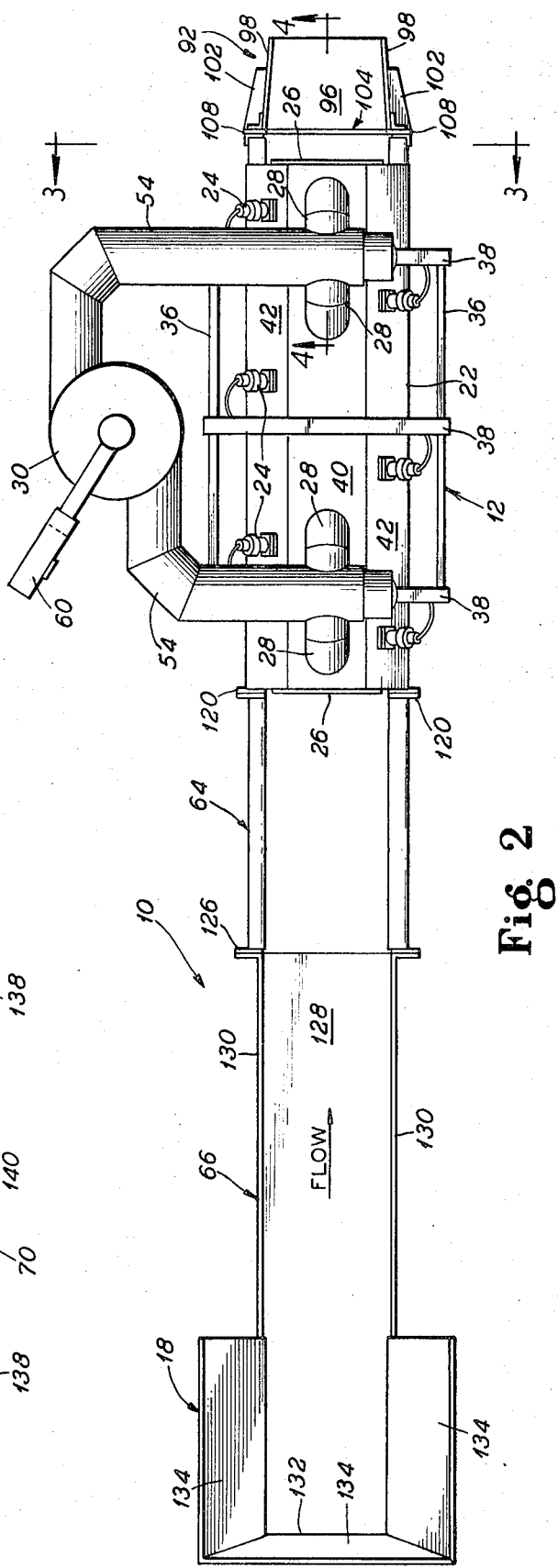
FIG. 2 is a plan view of the apparatus of FIG. 1.

The discharge throat 92 is affixed to the forward end of the insulated trough 16 adjacent the furnace charging bucket 20 by means of a flange 94 so as to reciprocate with the trough 16. The discharge throat serves to guide the scrap as it moves outwardly of the trough 16 and into the charging bucket; since it has only momentary contact with the heated scrap and is not located beneath the hood 22, it is not insulated. In the illustrated embodiment (FIGS. 2 and 4), the discharge throat is of generally U-shaped configuration in transverse cross section and includes a bottom wall 96 and side walls 98, the side walls converging inwardly toward the longitudinal center line of the throat from the end of the insulated trough 16 as they extend forwardly (FIG. 2) so as to thereby urge the scrap inwardly toward the center line of the throat. The discharge throat projects from the forward end of the insulated trough 16 in cantilever fashion and is supported from beneath by triangular braces 100 (FIG. 4). In addition, the throat is reinforced laterally at each side by a web 102 which is welded to the flange 94 and along the side walls 98, extending horizontally along the side walls but terminating short of the outer ends thereof.

As will be noted in FIG. 4, the bottom wall 96 and the side walls 98 of the discharge throat 92 project rearwardly past the flange 94 so as to occupy at least the edge portions of the grooves 90 in the bottom wall 80 and side walls 82 of the liner 78. The insulated trough 16 and the discharge throat 92 are illustrated in FIG. 4 in the unheated condition in which the edge portions of the bottom wall and side walls of the throat occupy only a small percentage of the groove 80. It will be appreciated, however, that as the liner undergoes thermal expansion, the edges of the throat will occupy a greater proportion of the groove 80.

In the loading of the trough 16, the scrap is frequently delivered intermittently to the driving and loading trough 66. Although it is possible to operate the conveyor 14 continuously so as to move the scrap continuously to and through the preheater unit 12, it is also frequently desirable to hold the scrap beneath the hood for a period of time to insure thorough heating. In such a case, it is advantageous to accumulate a quantity of scrap within the trough 16 and preclude its movement into the discharge throat and thence into the charging bucket 20 and to then halt the conveyor until the desired degree of heating has been achieved. In order to achieve the accumulation of scrap within the trough 16 under conditions in which the rate of delivery to the driving and loading trough is sporadic, a selectively positionable gate 104 is provided at the juncture of the insulated trough 16 and the discharge throat 92 which is movable between an elevated out-of-the-way position and an operative position in which the gate precludes the movement of scrap outwardly of the trough 16 into the delivery throat, the latter position being illustrated in FIGS. 1 and 4.

The gate 104, as illustrated, is formed from a flat piece of plate stock notched along the lower portion of each side edge to provide an obstructing portion 106 and arms 108 which project laterally outwardly adjacent the upper edge of the gate. The obstructing portion 106 is dimensioned and configured to completely span the loading compartment of the insulated trough 16 and function as a displaceable end wall therefor when in the operative position so as to preclude the passage of any scrap into the discharge throat 92. The gate 104 is of greater height than the interior of the trough 16; the arms 108 therefore extend laterally into overlying relation to the caps 86 which overlie the side walls of the trough when the gate is in the operative position.

The gate is mounted for vertical movement between the operative and the out-of-the-way position by means of guides 110 mounted on the outer surfaces of the side walls 76 of the outer shell 72 and the side walls 98 of the discharge throat 92, each guide being in the form of an elongated vertically disposed L-shaped member positioned with one of its flanges against one of the walls of the outer shell or throat and with the other of its flanges projecting outwardly therefrom. A pair of guides 110 is provided adjacent each side of the insulated trough 16 and each pair defines a slot within which the gate moves. It is contemplated that the gate be moved manually, although mechanical means may be provided, if desired.

It will be appreciated that when the gate 104 is in the operative position and the trough is reciprocated, scrap will advance no further than the gate and will accumulate over the length of the trough 16 beneath the hood.

As previously pointed out, the various sections of the conveyor 14, including the insulated trough 16, are supported on rollers 68 for reciprocal movement. In order to further protect the rollers 68 which support the insulated trough 16 from the heat within the liner 78, as well as from environmental heat in the vicinity of the hood 22, they are mounted so as to be shielded as well as insulated from such heat. More specifically, a pair of upwardly open channel beams 112 are secured to the lower surface of the bottom wall 74 of the outer shell 72 of the insulated trough 16 and extend longitudinally thereof. A pair of cross plates 114 extend across the lower surface of the beams 112 in closely spaced relation to each other adjacent each end of the trough 16, as well as intermediate the ends, and a pair of roller tracks 116 is welded to each of the three pair of cross plates. Each of the roller tracks is relatively short compared to the length of the trough, it being necessary only that each track has a length somewhat greater than the stroke of the trough as it reciprocates. Each track is of C-shaped configuration and is open laterally outwardly. The distance between the flanges of each of the C-shaped track sections is slightly greater than the outer diameter of the rollers 68 so that the rollers engage only the lower surface of the upper flange of each of the tracks. However, should extensive warping occur, which is not anticipated, the rollers might alternatively engage the upper surfaces of the lower flanges of the track. The rollers 68 are mounted for rotational movement about horizontal axes on posts 118.

The insulated trough 16 is provided at its rearward or entry end with a flange 120 by means of which it is joined to a mating flange secured to the connecting trough 64. The connecting trough 64, like the insulated trough 16, includes an outer shell and a liner arranged to provide a space therebetween but, unlike the trough 16, this space is not filled with a manufactured insulating material but rather simply with air which, of course, provides some degree of insulation. Channel beams 122 similar to the beams 112 of the trough 16 are welded to the under surface of the connecting trough 64 and a pair of cross plates 124 are welded to these beams for mounting of roller tracks 116.

The connecting trough 64 is, in turn, connected by means of flanges 126 to the forward end of the driving and loading trough 66. The driving and loading trough is also of generally U-shaped configuration in transverse cross section and includes a bottom wall 128, side walls 130, and a back wall 132 of single thickness rather than a double-walled construction as was the case with the connecting trough 64. Extensions 134 of the side and back walls 130 and 132 extend upwardly and outwardly adjacent the delivery station 18 to facilitate introduction of scrap into the trough 66. A pair of tracks 136 for engagement by rollers 68 are welded to the end surface of the bottom wall 128 adjacent both the rearward and forward ends thereof, as well as intermediate the ends.

A drive unit 70 may be of the type conventionally used in shaker-type conveyors and may, for example, be similar to that illustrated and described in the aforementioned U.S. Pat. No. 2,029,133. As illustrated, the unit is disposed in a recess in the foundation upon which the conveyor is supported and includes a pair of posts 138 and a housing 140. The housing 140 contains a suitable drive motor and gearing which causes oscillating movement of a shaft 142 having mounted thereon a crank 144. The crank 144 is connected by means of a link 146 to a suitable bracket 148 on the under surface of the drive and loading trough 66 to effect reciprocating movement.

In the use of the apparatus 10, scrap is delivered onto the drive and loading trough 66 at the loading station 18. As the conveyor reciprocates on the rollers 68, scrap is moved along the conveyor from left to right, as the apparatus is viewed in FIGS. 1 and 2, until it reaches the gate 104. Continued deposit of scrap onto the conveyor and continued reciprocatory movement thereof will cause the scrap to accumulate on the insulated trough 16, with the scrap which abuts the gate 104 serving to preclude the advance of additional scrap along the trough 16 so as to eventually cause a buildup of scrap along the bottom wall of the liner 78. When sufficient scrap is accumulated in the insulated trough 16, operation of the conveyor is halted and the burners 24 are ignited to heat the scrap to the desired temperature. When the desired amount of heating has been achieved, the gate 104 is elevated and the conveyor again started, allowing the scrap to pass over the delivery throat and into the charging bucket 20.

Although the above description refers to an intermittent operation of the apparatus, wherein the scrap is allowed to accumulate in the trough 16, after which the burners are ignited, it would, of course, be possible to operate the conveyor and the preheater continuously to effect a continuous movement of scrap along the conveyor.

Various of the features of the invention are set forth in the following claims.

What is claimed is:

1. An apparatus for delivering preheated scrap to a furnace or the like, said apparatus comprising an elongated conveyor trough supported for reciprocal movement and including an upwardly open outer shell having a bottom wall and side walls, an upwardly open inner shell having a bottom wall and side walls, said inner shell being disposed within said outer shell with said bottom wall and said side walls of said inner shell being separated from said bottom wall and side walls respectively of said outer shell to define a space therebetween, said bottom wall of said inner shell being substantially planar and providing an unobstructed path along which the scrap material may be conveyed, a semi-solid bulk insulating material disposed within said space and coextensive therewith, means for effecting reciprocal movement of said conveyor trough effective to advance scrap material therealong, means for delivering scrap material to one end of said trough, means for heating the scrap material within said trough to a predetermined temperature sufficient to vaporize contaminants on the surface of the scrap, means for containing gases produced incident to the heating of the scrap to hinder such gases from escaping to the atmosphere surrounding said trough, and means for conveying said contained gases to a location remote from said trough.

2. An apparatus in accordance with claim 1, wherein said means for delivering scrap material to said elongated shaker conveyor trough insulated with a semi-solid bulk material includes at least one additional elongated trough connected to said one end of said elongated shaker conveyor trough and mounted for reciprocal movement therewith, said additional trough including an upwardly open outer shell having a bottom wall and side walls, and an upwardly open inner shell having a bottom wall and side walls, said inner shell being disposed within said outer shell with said bottom wall and said side walls of said inner shell being separated from said bottom wall and said side walls, respectively, of said outer shell to define an insulating space therebetween.

3. An apparatus in accordance with claim 1, wherein said means for containing gases produced incident to the heating of the scrap includes a hood disposed above that portion of said trough containing scrap being heated, said hood being formed of a gas-impervious material and including upwardly extending side walls, a top wall and end walls, said hood being disposed relative to said trough with the lower edges of said side walls of said hood in close proximity to the upper edges of said side walls of said trough to hinder the passage of gases outwardly therebetween, and a movable gate extending from adjacent the lower edge of each of said end walls of said hood downwardly into the interior of said trough to hinder a flow of gases from beneath said hood outwardly therefrom at the ends of said hood.

4. An apparatus in accordance with claim 3, wherein each of said gates is mounted for hinged movement to the lower edge of one of said end walls of said hood.

5. A shaker conveyor trough capable of withstanding exposure to high temperatures, said trough comprising
   A. an upwardly open outer shell having a bottom wall and side walls,
   B. an upwardly open inner shell having a bottom wall and side walls,
      1. said inner shell being disposed within said outer shell with said bottom wall and said side walls of said inner shell being separated from said bottom wall and said side walls, respectively, of said outer shell to define a space therebetween,
   C. a semi-solid bulk insulating material disposed within said space and coextensive therewith,
   D. and means for supporting said trough for reciprocal movement.

6. A shaker conveyor trough in accordance with claim 5, wherein means are provided within said space for maintaining said separation between said walls of said inner shell and said walls of said outer shell when said trough is loaded.

7. A shaker conveyor trough in accordance with claim 6, wherein said means for maintaining said separation includes load-supporting ribs extending longitudinally of said trough along the length thereof.

8. A shaker conveoyor trough in accordance with claim 5, wherein said means for supporting said trough for reciprocal movement comprises means defining a pair of horizontally spaced tracks beneath said trough arranged in parallel relation to the longitudinal axis thereof, said tracks being adapted to cooperate with rollers mounted on a stationary surface for rotation about horizontal axes, and means securing said tracks to said trough in spaced relation to the bottom wall of said outer shell to provide an insulating air space between said bottom wall and said tracks.

9. A shaker conveyor trough in accordance with claim 5, wherein said insulating material comprises silica-alumina fibers.

10. A shaker conveyor in accordance with claim 5, wherein a vertically disposed gate member is mounted at the discharge end of said trough for selective vertical movement relative to said trough to facilitate accumulation within said trough of material advancing therealong.

11. A shaker conveyor trough capable of withstanding exposure to high temperatures, said trough comprising an upwardly open outer shell having an outer wall and side walls, an upwardly open inner shell having a bottom wall and side walls, said inner shell being disposed within said outer shell with said bottom wall and said side walls of said inner shell being separated from said bottom wall and said side walls, respectively, of said outer wall to define a space therebetween, a semi-solid bulk insulating material disposed within said space and coextensive therewith, means for supporting said trough for reciprocal movement, and a discharge throat having a bottom wall and side walls affixed at one end of said trough for reciprocal movement therewith, said inner shell being of lesser length than said outer shell at ambient temperature and being positioned within said outer shell to provide a gap between one end of said inner shell and the adjacent end of said outer shell, said bottom wall and said side walls of said inner shell having a groove at one end of said inner shell, and an edge of said bottom wall and said side walls of said discharge throat being disposed in said groove to bridge said gap and protect the insulation therebeneath.

* * * * *